(12) United States Patent
Albinger et al.

(10) Patent No.: US 10,197,035 B2
(45) Date of Patent: Feb. 5, 2019

(54) SHUTDOWN CIRCUIT FOR AN IGNITION SYSTEM OF A LAWN CARE DEVICE IN CASE OF DEFECTIVE PROCESSOR

(71) Applicant: HUSQVARNA AB, Huskvarna (SE)

(72) Inventors: Matt Albinger, Shelby, NC (US); Paul Beuger, Charlotte, NC (US)

(73) Assignee: HUSQVARNA AB, Huskvarna (SE)

( * ) Notice: Subject to any disclaimer, the term of this patent is extended or adjusted under 35 U.S.C. 154(b) by 149 days.

(21) Appl. No.: 15/102,372

(22) PCT Filed: Dec. 12, 2014

(86) PCT No.: PCT/IB2014/066856
§ 371 (c)(1),
(2) Date: Jun. 7, 2016

(87) PCT Pub. No.: WO2015/087296
PCT Pub. Date: Jun. 18, 2015

(65) Prior Publication Data
US 2016/0356255 A1 Dec. 8, 2016

Related U.S. Application Data

(60) Provisional application No. 61/915,214, filed on Dec. 12, 2013.

(51) Int. Cl.
*F02D 41/22* (2006.01)
*F02P 3/04* (2006.01)
(Continued)

(52) U.S. Cl.
CPC ............. *F02P 5/15* (2013.01); *A01D 34/006* (2013.01); *A01D 34/64* (2013.01);
(Continued)

(58) Field of Classification Search
CPC .... F02P 5/15; F02P 11/025; F02P 3/04; F02D 41/26; F02D 41/222; F02D 41/042;
(Continued)

(56) References Cited

U.S. PATENT DOCUMENTS 4,893,605 A * 1/1990 Ozawa ................. F02P 3/0556
123/632
4,924,831 A * 5/1990 Piteo ....................... F02P 1/086
123/406.57

(Continued)

FOREIGN PATENT DOCUMENTS

DE 3344726 A1 6/1985
EP 1643120 A2 4/2006
JP S5999554 A 6/1984

OTHER PUBLICATIONS

International Search Report and Written Opinion for International Application No. PCT/IB2014/066856 dated Mar. 27, 2015.
(Continued)

*Primary Examiner* — David Hamaoui
(74) *Attorney, Agent, or Firm* — McNair Law Firm, P.A.

(57) ABSTRACT

A lawn care device may include an engine to selectively power the lawn care device, a frame supporting the engine of the lawn care device, an ignition system for selectively powering the lawn care device based at least in part on operation of an ignition interface controlled by a processor (310), an optical isolator (320) which detect the operational presence of the processor (310) and a shutdown circuit (300) which is able to ground out the ignition coil (360) as a function of the conductive state of the optical isolator (320); the shutdown circuit being powered by an ignition coil (360) of the ignition system to generate a failsafe condition in response to failure or loss of the processor (310).

14 Claims, 6 Drawing Sheets

(51) Int. Cl.
*F02P 5/15* (2006.01)
*F02D 41/04* (2006.01)
*F02P 11/02* (2006.01)
*F02B 77/08* (2006.01)
*A01D 34/68* (2006.01)
*A01D 34/00* (2006.01)
*A01D 34/64* (2006.01)
*F02D 41/26* (2006.01)
*A01D 101/00* (2006.01)

(52) U.S. Cl.
CPC .......... *A01D 34/6818* (2013.01); *F02B 77/08* (2013.01); *F02D 41/042* (2013.01); *F02D 41/22* (2013.01); *F02D 41/222* (2013.01); *F02D 41/26* (2013.01); *F02P 3/04* (2013.01); *F02P 11/025* (2013.01); *A01D 2101/00* (2013.01); *B60Y 2200/223* (2013.01); *F02D 2041/227* (2013.01); *F02D 2200/101* (2013.01); *F02D 2400/06* (2013.01); *Y02P 90/265* (2015.11); *Y02T 10/40* (2013.01)

(58) Field of Classification Search
CPC ............... F02D 41/22; F02D 2200/101; F02D 2041/227; F02D 2400/06; A01D 34/006; A01D 34/64; A01D 34/6818; A01D 2101/00; Y02T 10/40; Y02P 90/265; B60Y 2200/223; F02B 77/08
See application file for complete search history.

(56) References Cited

U.S. PATENT DOCUMENTS

| | | | | |
|---|---|---|---|---|
| 5,730,098 | A * | 3/1998 | Sasaki | F02B 77/08 123/198 DB |
| 6,390,061 | B1 * | 5/2002 | Melville | F02D 31/002 123/353 |
| 6,609,357 | B1 * | 8/2003 | Davis | A01D 34/006 56/10.2 A |
| 6,675,784 | B2 * | 1/2004 | Nagase | F02P 3/051 123/603 |
| 2004/0011342 | A1 * | 1/2004 | Fukatsu | F02P 3/0435 123/630 |

OTHER PUBLICATIONS

International Preliminary Report on Patentability for International Application No. PCT/IB2014/066856, dated Jun. 14, 2016.

* cited by examiner

SHUTDOWN CIRCUIT FOR AN IGNITION SYSTEM OF A LAWN CARE DEVICE IN CASE OF DEFECTIVE PROCESSOR

TECHNICAL FIELD

Example embodiments generally relate to outdoor power equipment and, more particularly, some embodiments relate to a shutdown circuit for an ignition system of a lawn care vehicle.

BACKGROUND

Lawn care tasks are commonly performed using various tools and/or machines that are configured for the performance of corresponding specific tasks. Certain tasks, like grass cutting, are typically performed by lawn mowers. Lawn mowers themselves may have many different configurations to support the needs and budgets of consumers. Walk-behind lawn mowers are typically compact, have comparatively small engines and are relatively inexpensive. Meanwhile, at the other end of the spectrum, riding lawn mowers, such as lawn tractors, can be quite large. Riding lawn mowers can sometimes also be configured with various functional accessories (e.g., trailers, tillers and/or the like) in addition to grass cutting components. Riding lawn mowers provide the convenience of a riding vehicle as well as a typically larger cutting deck as compared to a walk-behind model.

Ignition systems for many handheld or walk behind outdoor power equipment devices are based on a recoil start (or pull start). In such a device, a rope with a grip at the end is coiled around a mechanism that is coupled to an end of the crankshaft. When the rope is pulled to cause uncoiling, the crankshaft spins to crank the engine. Larger pieces of equipment such as riding lawn mowers more commonly employ electric starters. Electric starters are generally used by larger pieces of equipment since the electric starting motor (or starter motor) of such devices typically requires battery power that is more practically supportable by a larger device. A common electric starter may include a starter solenoid. A key operated switch is typically used to apply battery power to the solenoid. Application of power to the solenoid through the key operated switch closes high current contacts for the starter motor to cause it to turn for a limited period of time to start the engine.

Although the use of a key operated switch is relatively familiar to many users, it represents a relatively limited user interface. Thus, it may be desirable to provide an improved, or more modern, user interface for vehicle starting. The provision of such an improved interface may also enable the provision of additional functionality that had not previously been possible to deliver.

BRIEF SUMMARY OF SOME EXAMPLES

Some example embodiments may provide an electronic ignition system for employment, for example, with riding lawn care equipment or other outdoor power equipment. The electronic ignition starting system may be considered to be a "smart ignition" system by virtue of the additional functionality it may provide relative to a conventional key operated switch in a starter system. Some example embodiments may improve the ability of operators to operate outdoor power equipment such as, for example, riding lawn mowers. In this regard, some embodiments may provide an improved ignition system that is operable without a key by employing functionality executable via a processor. However, the ignition system may be configured to have a failsafe condition in the event of a loss of the processor. The failsafe condition may be ensured by structuring a shutdown circuit of the ignition system such that it is controlled by the processor, but powered by the starting coil, so that loss of the processor will necessarily result in shutdown of the system.

In an example embodiment, a lawn care device may be provided. The lawn care device may include an engine to selectively power the lawn care device, a frame supporting the engine of the lawn care device, an ignition system for selectively powering the lawn care device based at least in part on operation of an ignition interface controlled by a processor, and a shutdown circuit controlled by the processor, but powered by an ignition coil of the ignition system to generate a failsafe condition in response to failure or loss of the processor.

In accordance with another example embodiment, an ignition system for a lawn care device is provided. The ignition system may selectively power the lawn care device. The ignition system may include an ignition coil for ignition of an engine of the lawn care device, a processor configured to control the ignition system, and a shutdown circuit controlled by the processor, but powered by the ignition coil to generate a failsafe condition in response to failure or loss of the processor.

In another example embodiment, a shutdown circuit for an ignition system of a lawn care device is provided. The ignition system may selectively power the lawn care device. The ignition system may include an ignition coil for ignition of an engine of the lawn care device, a processor configured to control the ignition system, and a shutdown circuit controlled by the processor, but powered by the ignition coil to generate a failsafe condition in response to failure or loss of the processor.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
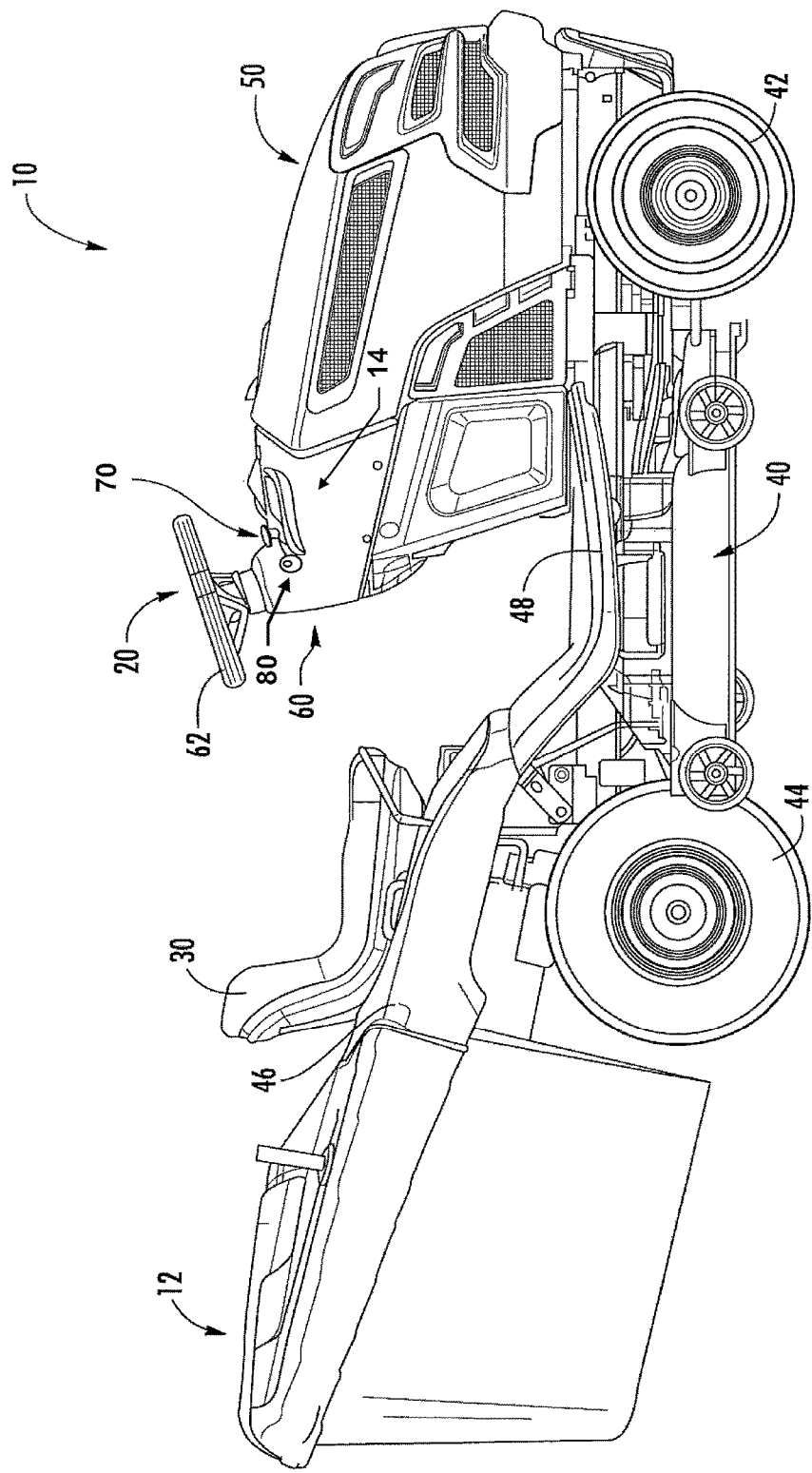
FIG. 1 illustrates a perspective view of the riding lawn care vehicle according to an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. Additionally, the term "lawn care" is meant to relate to any yard maintenance activity and need not specifically apply to activities directly tied to grass, turf or sod care. As used herein, operable coupling should be understood to relate to direct or indirect connection that, in either case, enables functional interconnection of components that are operably coupled to each other.

When a microprocessor is introduced into an ignition interface, the potential for employing additional functionality into the control and monitoring capabilities associated with the ignition interface may be increased. For example, by providing a number of sensor and/or safety switch inputs to the microprocessor, the corresponding inputs may be monitored to try to determine certain situations for which intervention or other functional activity may be desired. However, if the microprocessor should be damaged or otherwise fail to function while the device is operating, it may be desirable to have the entire system return to a static condition (e.g., shutdown).

A typical microprocessor-based system relies upon the microprocessor to assess situations and take actions. The ability to use a microprocessor for initiating various actions can often reduce part count and increase functional capabilities at the same time. Thus, there is significant motivation to rely on the microprocessor for as much control as possible. Within this context, the microprocessor is typically programmed to assess various sensor and/or switch positions to determine the status of corresponding components and make decisions regarding whether to initiate any applicable actions. The actions may include, in some cases, shutting down certain components or shutting down the entire device. However, if the microprocessor is also required to monitor conditions that require a shutdown to initiate the shutdown, it may be difficult to ensure that the device returns to a static condition in the event of a loss or malfunction of the microprocessor.

Some example embodiments have therefore been provided to create a failsafe shutdown circuit. The failsafe shutdown circuit may include an optical isolation relay and corresponding circuit structure that is configured to fail to a safe condition where the device is shutdown if the microprocessor is lost or functionally compromised. To accomplish the failsafe condition, the failsafe shutdown circuit is controlled by the microprocessor, but powered by the ignition coil of the ignition circuit. Accordingly, if the microprocessor is present and functioning, the failsafe shutdown circuit can operate to enable normal functioning of the ignition interface by ensuring that the power for the failsafe shutdown circuit is applied to prevent shorting of the ignition coil, which would shut down the device in which the ignition interface is provided. However, if the microprocessor is lost for any reason, the microprocessor (which is optically isolated from the ignition coil) may no longer prevent shorting of the ignition coil so that the ignition coil is shorted and the device is shutdown.

FIG. 1 illustrates an example lawn care device in the form of a riding lawn care vehicle 10 having a bagging attachment 12. However, it should be appreciated that example embodiments may be employed on numerous other riding lawn care vehicles that may not include a bagging attachment 12. The riding lawn care vehicle 10 may also include an operations panel 14 that may display operational information regarding the riding lawn care vehicle 10 and host various controls, gauges, switches, displays, and/or the like. As shown and described herein, the riding lawn care vehicle 10 may be a riding lawn mower (e.g., a lawn tractor, front-mount riding lawn mower, riding lawn mower with a zero or near zero degree radius of turn, cross mower, stand-on riding lawn mower, and/or the like). However, other example embodiments may be employed on other outdoor power equipment devices, such as walk behind lawn mowers, tillers, snow throwers, and/or the like.

The riding lawn care vehicle 10 may include a steering assembly 20 (e.g., including a steering wheel, handle bars, or other steering apparatus) functionally connected to wheels of the riding lawn care vehicle 10 to which steering inputs are provided (e.g., the front and/or rear wheels in various different embodiments) to allow the operator to steer the riding lawn care vehicle 10. In some embodiments, the riding lawn care vehicle 10 may include a seat 30 that may be disposed at a center, rear, or front portion of the riding lawn care vehicle 10. The operator may sit on the seat 30, which may be disposed to the rear of the steering assembly 20 to provide input for steering of the riding lawn care vehicle 10 via the steering assembly 20.

The riding lawn care vehicle 10 may also include, or be configured to support attachment of, a cutting deck 40 having at least one cutting blade mounted therein. In some cases, a height of the at least one cutting blade may be adjustable by an operator of the riding lawn care vehicle 10. The cutting deck 40 may be a fixed or removable attachment in various different embodiments. Moreover, a location of the cutting deck 40 may vary in various alternative embodiments. For example, in some cases, the cutting deck 40 may be positioned in front of the front wheels 42, behind the rear wheels 44, or in between the front and rear wheels 42 and 44 (as shown in FIG. 1) to enable the operator to cut grass using the at least one cutting blade when the at least one cutting blade is rotated below the cutting deck 40. In some embodiments, the cutting deck 40 may be lifted or rotated relative to the lawn mower frame to permit easier access to the underside of the lawn mower without requiring removal of the cutting deck 40. The cutting deck 40 may have one, two, three, or more cutting blades driven by one, two, three, or more rotatable shafts. The shafts may be rotated by any number of mechanisms. For example, in some embodiments, the shafts are coupled to a motor via a system of belts and pulleys. In other embodiments, the shafts may be coupled to the motor via a system of universal joints, gears, and/or other shafts. In still other embodiments, such as in an electric lawn mower, the shaft may extend directly from an electric motor positioned over the cutting deck.

In some embodiments, the front wheels 42 and/or the rear wheels 44 may have a shielding device positioned proximate thereto in order to prevent material picked up in the wheels from being ejected toward the operator. Fender 46 is an example of such a shielding device. When operating to cut grass, the grass clippings may be captured by a collection system (e.g., bagging attachment 12), mulched, or expelled from the cutting deck 40 via either a side discharge or a rear discharge.

The riding lawn care vehicle 10 may also include additional control-related components such as one or more speed controllers, brakes, cutting height adjusters, and/or the like. Some of the controllers, such as the speed controllers and/or brakes, may be provided in the form of foot pedals that may sit proximate to a footrest 48 (which may include a portion on both sides of the riding lawn care vehicle 10) to enable the operator to rest his or her feet thereon while seated in the seat 20.

In the pictured example embodiment of FIG. 1, an engine 50 of the riding lawn care vehicle 10 is disposed substantially forward of a seated operator. However, in other example embodiments, the engine 50 could be in different positions such as below or behind the operator. In some embodiments, the engine 50 may be operably coupled to one or more of the wheels of the riding lawn care vehicle 10 in order to provide drive power for the riding lawn care vehicle 10. In some embodiments, the engine 50 may be capable of powering two wheels, while in others, the engine 50 may power all four wheels of the riding lawn care vehicle 10. Moreover, in some cases, the engine 50 may manually or automatically shift between powering either two wheels or all four wheels of the riding lawn care vehicle 10. The engine 50 may be housed within a cover that forms an engine compartment to protect engine 50 components and improve the aesthetic appeal of the riding lawn care vehicle 10.

In an example embodiment, the engine compartment may be positioned proximate to and/or mate with portions of a steering assembly housing 60. The steering assembly housing 60 may house components of the steering assembly 20 to protect such components and improve the aesthetic appeal of the riding lawn care vehicle 10. In some embodiments, a steering wheel 62 of the steering assembly 20 may extend from the steering assembly housing 60 and a steering column (not shown) may extend from the steering wheel 62 down through the steering assembly housing 60 to components that translate inputs at the steering wheel 62 to the wheels to which steering inputs are provided.

In some embodiments, the engine 50 may also provide power to turn the cutting blade or blades disposed within the cutting deck 40. In this regard, for example, the engine 50 may be used to turn a shaft upon which the cutting blade or blades may be fixed (e.g., via a belt and pulley system and/or other mechanisms). The turning of the shaft, at high speeds, may move the cutting blade or blades through a range of motion that creates air movement that tends to straighten grass for cutting by the moving blade and then eject the cut grass out of the cutting deck 40 (e.g., to the bagging attachment 12 or to the back or side of the riding lawn care vehicle 10), unless the blade and mower are configured for mulching.

In an example embodiment, the engine 50 may turn at least one shaft that is coupled to corresponding ones of one or more cutting blades within the cutting deck 40 via a PTO clutch. When the PTO clutch is engaged, rotary power generated by the engine 50 may be coupled to the one or more cutting blades to cause rotation thereof (e.g., for cutting grass). When the PTO clutch is disengaged, rotary power generated by the engine 50 may not be coupled to the one or more cutting blades and thus the cutting blades may not rotate. In some embodiments, engagement of the PTO clutch may be accomplished via operation of a PTO switch 70 that may be disposed on or proximate to the operations panel 14.

The operations panel 14, or some other portion of the steering assembly housing 60, may also provide support for an ignition interface 80 of an example embodiment. The ignition interface 80 may be used for starting the engine 50 and for controlling other functions of the riding lawn care vehicle 10. In an example embodiment, the ignition interface 80 may not require a key to operate. Thus, the operator of the riding lawn care vehicle 10 may be enabled to start and/or initiate one or more functional capabilities of the riding lawn care vehicle 10 without the use of a physical key.

Figure 2:
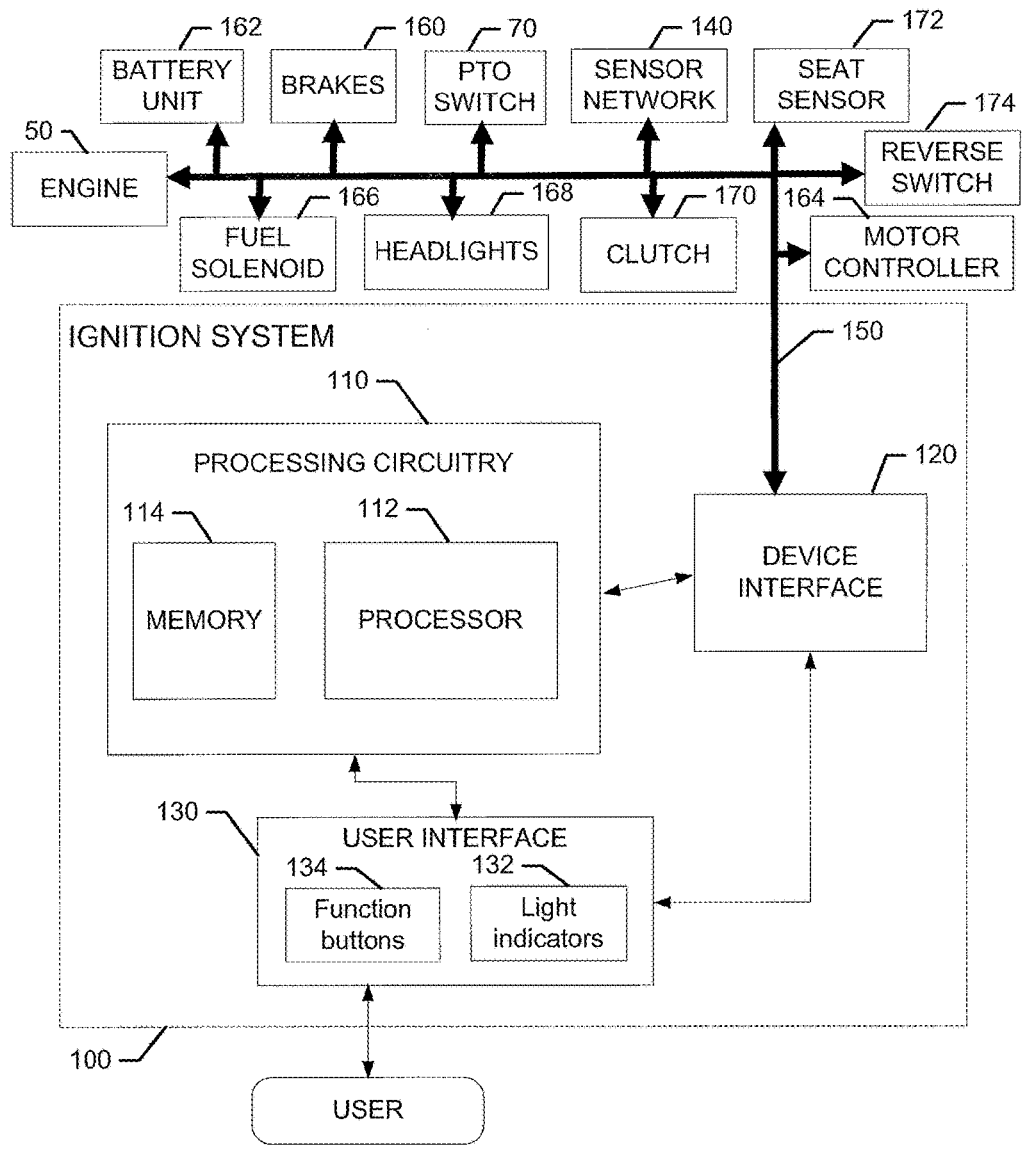
FIG. 2 illustrates a functional block diagram for explaining the operation of an ignition system of an example embodiment.

FIG. 2 illustrates a functional block diagram for explaining the operation of an ignition system 100 of an example embodiment. As shown in FIG. 2, the ignition system 100 may include processing circuitry 110 to control starting of the engine 50 of the riding lawn care vehicle 10 of an example embodiment as described herein. In this regard, for example, the ignition system 100 may utilize the processing circuitry 110 to provide electronic control inputs to one or more functional units of the riding lawn care vehicle 10 and to process data generated by the one or more functional units regarding various operational parameters relating to the riding lawn care vehicle 10. The processing circuitry 110 may be configured to perform data processing, control function execution, and/or other processing and management services according to an example embodiment of the present invention. In some embodiments, the processing circuitry 110 may be embodied as a chip or chip set. In other words, the processing circuitry 110 may comprise one or more physical packages (e.g., chips) including materials, components, and/or wires on a structural assembly (e.g., a baseboard). The structural assembly may provide physical strength, conservation of size, and/or limitation of electrical interaction for component circuitry included thereon. The processing circuitry 110 may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processing circuitry 110 may include one or more instances of a processor 112 and memory 114 that may be in communication with or otherwise control a device interface 120 and, in some cases, a user interface 130. As such, the processing circuitry 110 may be embodied as a circuit chip (e.g., an integrated circuit chip) configured (e.g., with hardware, software, or a combination of hardware and software) to perform operations described herein. However, in some embodiments, the processing circuitry 110 may be embodied as a portion of an on-board computer. In some embodiments, the processing circuitry 110 may communicate with electronic components and/or sensors of a sensor network 140 (e.g., sensors that measure variable values related to riding lawn care vehicle parameters) of the riding lawn care vehicle 10 via a single data bus (e.g., data bus 150), which may form a portion of the device interface 120 or which may connect to the device interface 120. As such, the data bus 150 may connect to a plurality or all of the sensors, switching components, and/or other electrically-controlled components of the riding lawn care vehicle 10 to the processing circuitry 110.

In an example embodiment, the data bus 150 may further provide a mechanism by which the processing circuitry 110 can interface with or control other functional units of the riding lawn care vehicle 10. For example, in some embodiments, the data bus 150 may provide control inputs to and/or receive status inputs from functional units such as any or all of the engine 50, PTO switch 70, brakes 160 (which may include a parking brake), a battery unit 162, one or more motor controllers 164, a fuel solenoid 166, headlights 168, clutch 170, seat sensor 172, reverse switch 174, and/or the like.

The user interface 130 may be in communication with the processing circuitry 110 to receive an indication of a user input at the user interface 130 and/or to provide an audible, visual, mechanical, or other output to the user. As such, the user interface 130 may include, for example, a display, one or more levers, switches, buttons or keys (e.g., function buttons), and/or other input/output mechanisms. In an example embodiment, the user interface 130 includes the ignition interface 80, which may further include a plurality of light indicators 132 and a plurality of function buttons 134 that will be described in greater detail below.

The light indicators 132 may be LEDs or LED backlit images that are lit or unlit to indicate corresponding status information. The information indicated by the light indicators 132 may be directly related to the corresponding function buttons 134 in some cases. However, in other cases, some of the light indicators 132 may indicate status information associated with other functional units (e.g., those connected to the data bus 150). Meanwhile, the function buttons 134 may be employed for initiation of various control operations to actuate or turn off corresponding ones of the functional units.

However, in an example embodiment, the function buttons 134 may also have an alternative functionality associated with starting of the engine 50. In this regard, for example, the function buttons 134 may be used for the provision of a code that is required to start the engine 50. In an example embodiment, the function buttons 134 may include one button that functions as a start button that must be depressed or otherwise actuated in order to start the engine 50. However, the start button may not be enabled for operation to start the engine 50 until an unlocking code is entered via other ones of the function buttons 134. Thus, the function buttons 134 may include at least some code entry or unlocking buttons and a start button, and the start button may only be unlocked for starting responsive to entry of an unlocking code using the code entry or unlocking buttons.

The device interface 120 may include one or more interface mechanisms for enabling communication with other devices (e.g., sensors of the sensor network 140 and/or other accessories or functional units such as motors, engines, servos, switches, or other operational control devices for providing control functions). In some cases, the device interface 120 may be any means such as a device or circuitry embodied in either hardware, or a combination of hardware and software that is configured to receive and/or transmit data from/to sensors in communication with the processing circuitry 110 via the data bus 150. Thus, for example, the device interface 120 may provide interfaces for communication of components of the riding lawn care vehicle 10 via the data bus 150.

The processor 112 may be embodied in a number of different ways. For example, the processor 112 may be embodied as various processing means such as one or more of a microprocessor or other processing element, a coprocessor, a controller, or various other computing or processing devices including integrated circuits such as, for example, an ASIC (application specific integrated circuit), an FPGA (field programmable gate array), or the like. In an example embodiment, the processor 112 may be configured to execute instructions stored in the memory 114 or otherwise accessible to the processor 112. As such, whether configured by hardware or by a combination of hardware and software, the processor 112 may represent an entity (e.g., physically embodied in circuitry—in the form of processing circuitry 110) capable of performing operations according to embodiments of the present invention while configured accordingly. Thus, for example, when the processor 112 is embodied as an ASIC, FPGA, or the like, the processor 112 may be specifically configured hardware for conducting the operations described herein. Alternatively, as another example, when the processor 112 is embodied as an executor of software instructions, the instructions may specifically configure the processor 112 to perform the operations described herein.

In an example embodiment, the processor 112 (or the processing circuitry 110) may be embodied as, include, or otherwise control the operation of the ignition system 100 based on inputs received by the processing circuitry 110 responsive to positioning of the function buttons 134 and/or the operation of various ones of the functional units. As such, in some embodiments, the processor 112 (or the processing circuitry 110) may be said to cause each of the operations described in connection with the ignition system 100 in relation to operation of the functional units and/or function buttons 134 to undertake the corresponding functionalities responsive to execution of instructions or algorithms configuring the processor 112 (or processing circuitry 110) accordingly. In an example embodiment, the processor 112 may be physically located within a body that houses the electronics for the ignition interface 80, and the processor 112 may be the processor for the entire riding lawn care vehicle 10.

In an exemplary embodiment, the memory 114 may include one or more non-transitory memory devices such as, for example, volatile and/or non-volatile memory that may be either fixed or removable. The memory 114 may be configured to store information, data, applications, instructions, or the like for enabling the processing circuitry 110 to carry out various functions in accordance with exemplary embodiments of the present invention. For example, the memory 114 could be configured to buffer input data for processing by the processor 112. Additionally or alternatively, the memory 114 could be configured to store instructions for execution by the processor 112. As yet another alternative or additional capability, the memory 114 may include one or more databases that may store a variety of data sets responsive to input from the sensor network 110, functional units, and/or the function buttons 134. Among the contents of the memory 114, applications may be stored for execution by the processor 112 in order to carry out the functionality associated with each respective application. In some cases, the applications may include instructions for recognition of various input signals related to engine ignition as described herein.

In an example embodiment, various ones of the functional units may impact each other. For example, the PTO switch 70 (which may be an electric or manual switch) may be used to alter a position of the clutch 170. Likewise, the motor controller 164 (if employed) may impact the application of battery power from the battery unit 162 to either a drive motor or a cutting motor. The position of the fuel solenoid 166 may impact operation of the engine 50 by cutting off or allowing fuel to reach the engine 50 in embodiments where the engine 50 is a gasoline engine. Inputs regarding position of the brakes 160 and/or the PTO switch 70 may impact operation of the clutch 170, engine 50, and/or the like. Battery unit 162 status, status of the headlights 168, and/or other sensor network component status may be reported to and/or controlled by operation of the function buttons 134. Accordingly, it should be appreciated that the ignition system 100 of an example embodiment, and particularly the data bus 150 and the processing circuitry 110 may enable the user interface 130 to provide a relatively robust interface mechanism for controlling starter operation and numerous other functions of the riding lawn care vehicle 10.

Figure 3:
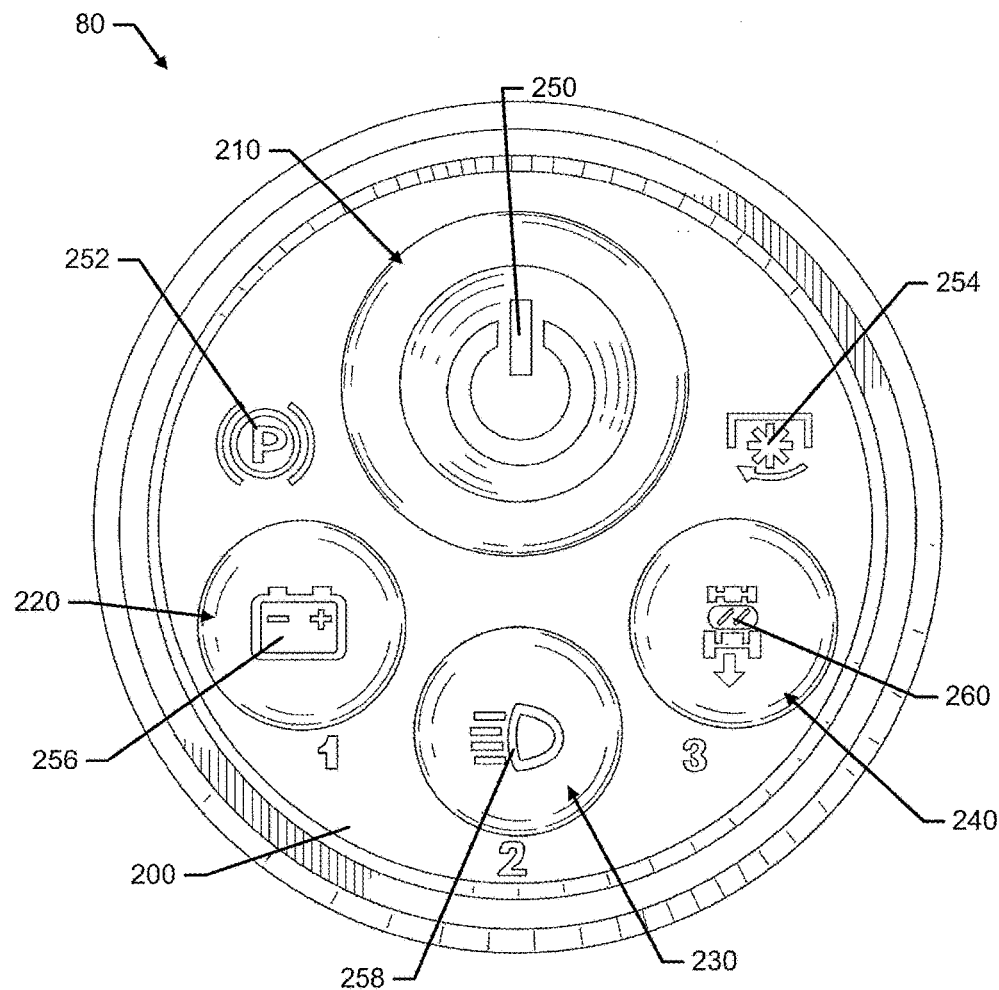
FIG. 3 illustrates a plan view of an arrangement of the ignition interface of an example embodiment.

FIG. 3 illustrates a plan view of an arrangement of the ignition interface 80 of an example embodiment. In this regard, FIG. 3 illustrates an assembly which may include a housing in which circuitry of the ignition interface 80 may be housed. The housing may be plugged into a receptacle of the operations panel 14 to plug into a system of wiring and/or circuitry of the riding lawn care vehicle 10. As shown in FIG. 3, the ignition interface may include a panel face 200 onto which the light indicators 132 and the function buttons 134 are provided. In this example, the panel face 200 is round and includes raised buttons (i.e., the function buttons 134) provided thereon. Meanwhile, the light indicators 132 may be provided in the panel face 200 itself, or in one or more of the function buttons 134. The light indicators 132 may each be a single color or may have multiple potential colors. In some cases, the light indicators 132 may have variable intensity so that brightness may ramp up (or down) over time. In some cases, the ramp up or down function may be based on external conditions. For example, if it is dark, a ramp up may be initiated. Blinking, lighting patterns, and/or color changes may indicate specific conditions or operation modes related to respective different ones of the light indicators 132, or to the operation of the ignition interface 80 in general.

The ignition interface 80 may have multiple modes of operation that impact the functioning of the ignition system 100 and various other components of the riding lawn care vehicle 10. In an example embodiment, the ignition interface 80 may have an off or sleep mode, a wake-up mode, a ready to start or starting mode, and a running mode. The wake-up mode and the starting mode may generally be transient modes that are not allowed to be maintained for a long period of time. As such, the wake-up mode and the starting mode may each have time limits associated therewith such that if no activity is noted in each respective mode within a given period of time, the ignition interface 80 will be returned to one of the non-transient modes of operation (i.e., the sleep mode or the running mode). The sleep mode and the running mode are generally capable of continued and indefinite operation as long as other prerequisites to operation in such modes are met.

As shown in FIG. 3, a power button 210, a first key 220 a second key 230 and a third key 240 may each be examples of function buttons 134. The function buttons 134 may be any kind of pushbutton, press button, or the like. Thus, the function buttons 134 may be flush-mounted or may extend outward from the panel face 200. Actuation of the function buttons 134 may initiate a changing of a switch position or an indication to the processing circuitry 110 to indicate that a corresponding function button 134 has been actuated. In some cases, the function buttons 134 may be biased switches that return to their original position after each actuation thereof. Thus, a most recent position or current status of the function buttons 134 may be maintained within the processing circuitry 110, and the processing circuitry 110 may also interface with other appropriate devices to actuate the functionality associated with any one of the function buttons 134 that is actuated and/or to turn on any light indicators 132 or other display indications that are appropriate to indicate the status of a device impacted by operation of one of the function buttons 134.

Meanwhile, a first light 250, a second light 252, a third light 254, a fourth light 256, a fifth light 258, and a sixth light 260 may be examples of light indicators 234. In an example embodiment, the first light 250 may be associated with the power button 210 and may indicate engine status and/or ignition interface 80 mode of operation. The first light 250 may be capable of showing different colors dependent upon the mode of operation of the ignition interface 80. The first light 250 may also blink according to specific patterns that indicate receipt of information or a mode of operation.

The second light 252 may be a parking brake indicator light that is lit when the parking brake is or is not set, depending on the current mode. For example, when a fault associated with the parking brake is detected, the second light 252 may be lit. As such, if setting of the parking brake is a precondition for engine starting, and the parking brake is not set, the second light 252 may be lit and may clear when the parking brake is set. The second light 252 may also be lit in instances where all lights, or combinations of lights, are lit to indicate certain faults. The third light 254 may be a PTO engagement indicator light that is lit when the PTO is engaged and off when the PTO is not engaged. The second and third lights 252 and 254 may not be specifically or physically associated with any one of the function buttons 134.

The fourth light 256 may be a battery light that indicates a status of the battery unit 162 when lit. For example, the fourth light 256 may be lit whenever battery level is low. In some embodiments, pressing the fourth light 256 may present an inquiry as to charge status of the battery. The fourth light 256 may present a color or a blink pattern to indicate current state of charge of the battery. The fourth light 256 may be disposed on the first key 220.

The fifth light 258 may be a headlight indicator light that is lit when the headlights 168 are energized and off when they are not energized. In some embodiments, the headlights may ramp up to full brightness over time when they are energized, and may ramp down to being off when they are de-energized. The headlights may stay on for a delay period after engine shutdown if the operator does not manually turn them off using the second key 230. If the headlights are turned on without the engine running, they may automatically shutoff after a specified period of time (e.g., two minutes). In some embodiments, if the engine is not running, the operator may be required to enter a valid code to turn on the headlights. However, if the headlights turn off after the automatic shutoff period, the operator may have a relatively short window of time during which the lights may be turned back on without reentry of the code. In some cases, the fifth light 258 may also light to indicate faults associated with the headlights (e.g., one or more burned out bulbs). The fifth light 258 may be disposed on the second key 230.

The sixth light 260 may be a mow-in-reverse (MIR) indicator light that is lit when MIR is activated and off when MIR is not activated. However, in some embodiments, the sixth light 260 may be used to indicate whether steering handles are in the park position. The sixth light 260 may light or blink to indicate various fault conditions associated with MIR or with the position of steering handles. In some cases, the sixth light 260 may have an amber color. The sixth light 260 may be disposed on the third key 240.

In an example embodiment in which the first, second, and third keys 220, 230, and 240 each have a corresponding light indicator associated therewith (e.g., fourth light 256, fifth light 258, and sixth light 260), the corresponding light indicators may be associated with one of the functional operations that the respective keys are capable of initiating in at least one operating mode of the ignition interface 80. However, since the first, second, and third keys 220, 230, and 240 may have multiple functions (i.e., different functions in different modes) and one such function may be code entry, in some embodiments, a code value or number associated with each respective one of the first, second, and third keys 220, 230, and 240 may be indicated on or proximate to each key. Thus, for example, if a valid starting code is "1-3-2," the operator may be enabled to correlate the value "1" with the first key 220, and correlate the value "3" with the third key 240, while correlating the value "2" with the second key 230. The operator may then enter each key actuation in sequence to unlock the functionality of the power button 210 for engine startup. In other words, the code entry keys may enter the code for shifting from wake-up mode to starting mode.

Figure 4:
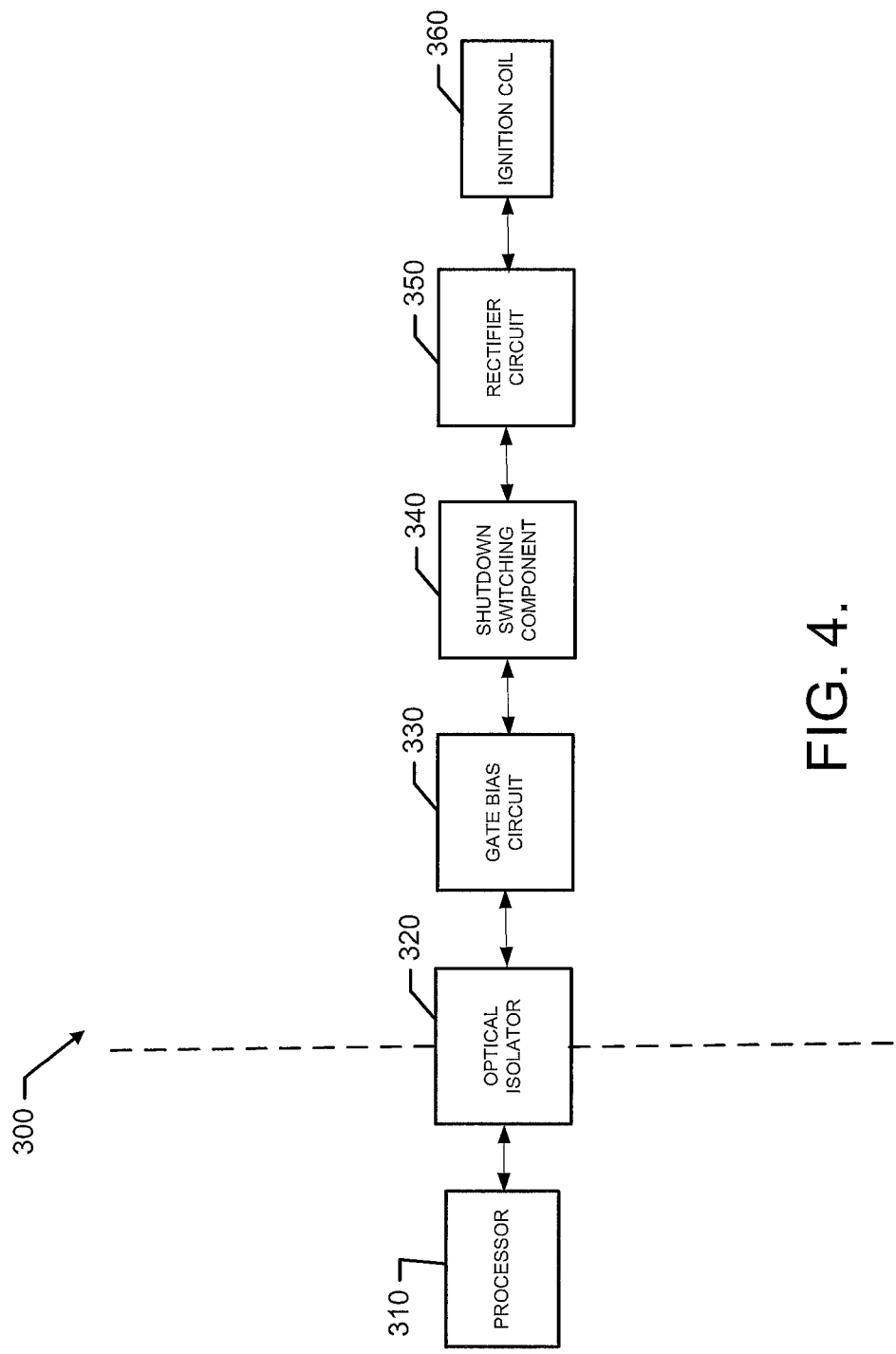
FIG. 4 illustrates a block diagram of an example of a shutdown circuit according to an example embodiment.
Figure 5:
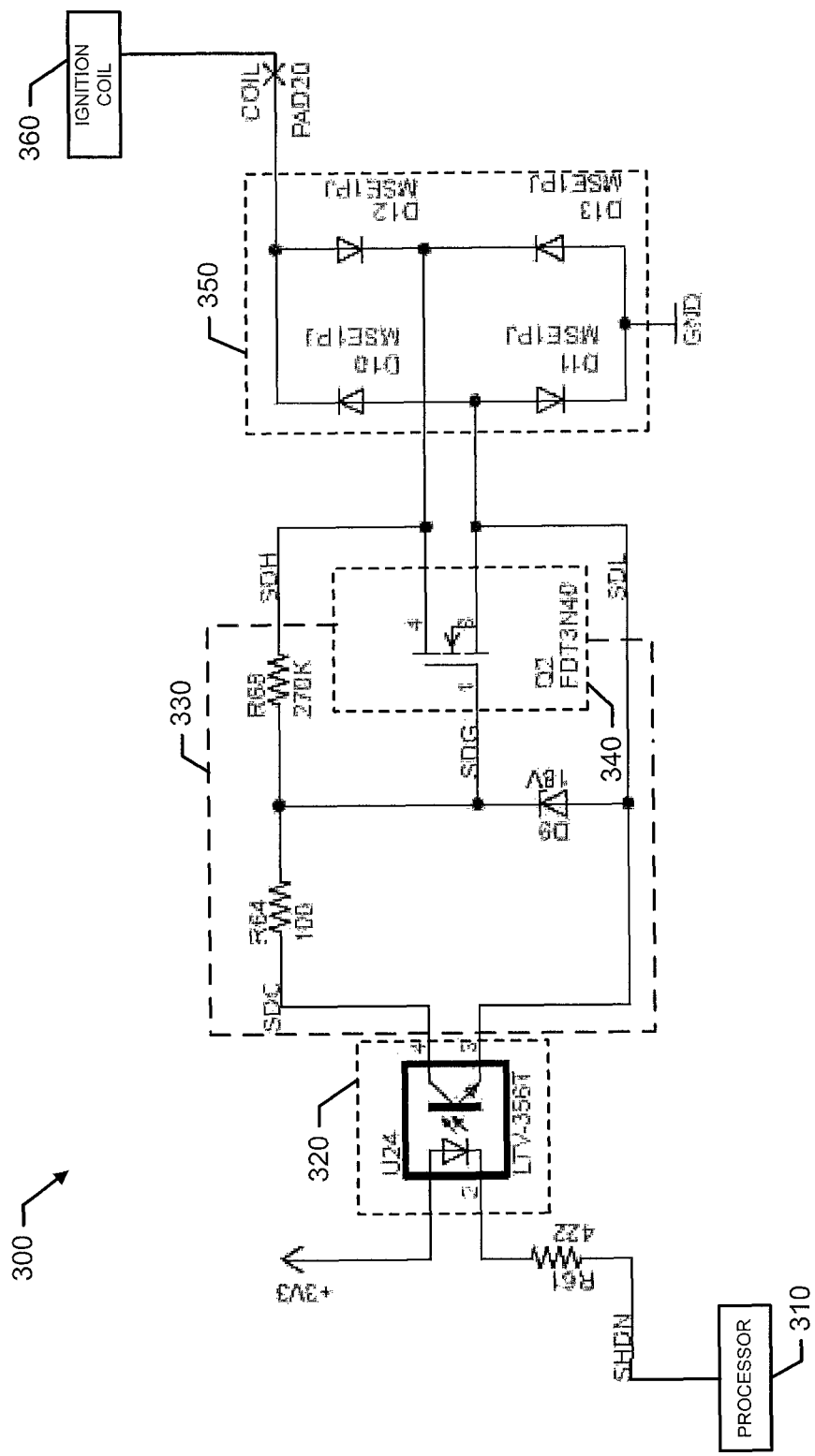
FIG. 5 illustrates a circuit diagram according to one possible implementation design of the shutdown circuit according to an example embodiment.

FIG. 4 illustrates a block diagram of an example of a shutdown circuit 300 according to an example embodiment. FIG. 5 illustrates a circuit diagram according to one possible implementation design of the shutdown circuit 300 according to an example embodiment. It should be appreciated that the shutdown circuit 300 may interface with a processor 310 or processing circuitry, each of which may be examples of the processor 112 and processing circuitry 110, respectively, described above. Thus, for example, various control operations described herein relative to the shutdown circuit 300 may be executed by the processor 310. As such, for example, at least some of the functions attributable to the shutdown circuit 300 (and/or components thereof) may be carried out by or otherwise instructed by the processor 310. The processor 310 may therefore provide the hardware for hosting software to configure the system for control and implementation of monitoring and/or control techniques consistent with example embodiments. However, as will be seen below, the hardware and circuit structure of the shutdown circuit 300 may carry out much of the functionality of example embodiments insofar as such functionality is associated with creating a failsafe condition for the riding lawn care vehicle 10 in the event of a loss of the processor 310.

The processor 310 may be configured to perform input processing, control function execution, and/or other services according to an example embodiment of the present invention. In some embodiments, the processor 310 may be a portion of processing circuitry that may be embodied as a chip or chip set, as described above.

In an example embodiment, the processor 310 may be capable of interfacing with various switches or modules to control operation of the riding lawn care vehicle 10, and/or to control operation of the ignition interface 80. Moreover, in some embodiments, the processor 310 may interface with various modules of the shutdown circuit 300 in order to create the failsafe condition. FIG. 4 illustrates some of the modules that may operate functionally in order to enable the shutdown circuit 300 to operate, and FIG. 5 illustrates an example of the circuitry that may be employed to embody the modules in one example.

As shown in FIG. 4, the shutdown circuit 300 may include an optical isolator 320, a gate bias circuit 330, a shutdown switching component 340, and a rectifier circuit 350. The rectifier circuit 350 may interface with an ignition coil 360, which may further interface with a flywheel and/or spark plug(s) of the ignition system of the riding lawn care vehicle 10. The flywheel, spark plug(s), and the ignition coil 360 may operate relative to starting up the engine 50 of the riding lawn care vehicle 10. However, the shutdown circuit 300 may be further provided to ensure that a failsafe condition is entered in the event of a loss of the processor 310.

In accordance with an example embodiment, the optical isolator 320 may function to interface with the gate bias circuit 330 so that the shutdown switching component 340 (e.g., Q2 in FIG. 5) is placed in a state such that the ignition coil 360 operates normally when operational presence of the processor 310 is detected by the optical isolator 320. However, if the optical isolator 320 no longer detects operational presence of the processor 310, the optical isolator 320 may cause the gate bias circuit 330 to gate or trigger the shutdown switching component 340 to short the ignition coil 360 and shutdown the engine 50 of the device (e.g., the riding lawn care vehicle 10).

The exemplary embodiment of the shutdown circuit 300 shown in FIG. 5 includes a 3V power supply that can be selectively allowed to conduct through terminals 1 and 2 of the optical isolator 320 and through a resistor (R61) when the processor 310 applies ground to terminal SHDN. The optical isolator 320 is positioned between and/or interfaces with the processor 310 and the gate bias circuit 330. The rectifier 350 is positioned between and/or interfaces with the ignition coil 360 and the shutdown switching component 340 and the gate bias circuit 330. The gate bias circuit 330 is positioned to selectively gate or trigger the shutdown switching component 340. In some examples, the gate bias circuit 330 may include a first terminal SDH, a second terminal SDL, a first resistor (R64), a second resistor (R68), and a diode (D9). The second resistor (R68) may be positioned and/or connected between the first terminal SDH and the first resistor (R64). The diode (D9) may be connected to a node that is positioned and/or connected between the first resistor (R64) and the second resistor (R68) to establish a voltage at the gate of Q2 based on whether current is conducted through the first resistor (R64). The rectifier 350 may include diodes arranged to form a bridge rectifier circuit positioned between the ignition coil 360 and the first terminal SDH and second terminal SDL. It should be appreciated that other structures relative to specific placement and values of circuit components could alternatively be employed in other embodiments.

As can be appreciated from FIG. 5, the optical isolator 320 may be embodied as an optical isolation relay that may function as a gate bypass relay. In some cases, the optical isolator 320 may be embodied as a transistor output optocoupler. In some embodiments, the shutdown switching component 340 may be embodied as a transistor (e.g., a bipolar junction transistor (BJT), a field effect transistor (FET—including MOSFET or JFET), and/or the like). When a signal indicative of operational presence of the processor 310 (i.e., indicative of normal processor 310 functioning) is provided, the optical isolator 320 may conduct between terminals 1 and 2 thereof and an optical signal may gate the optical isolator 320 such that conduction between terminals 4 and 3 of the optical isolator 320 is enabled. In an example embodiment, a 3V source may be coupled to a pin of the processor 310 (e.g., the pin labeled SHDN in FIG. 5) such that the processor 310 can provide a path to ground for the 3V signal when the processor 310 is operational. If the processor 310 is operational, the operational presence is signaled by the 3V signal being used to gate the optical isolator 320. However, in some cases, the processor 310 may be operational but choose to affect a shutdown of the system by opening (i.e., not providing) the path to ground for the 3V signal. In such cases, the optical isolator 320 may prevent conduction between terminals 4 and 3 thereof to gate the shutdown switching component 340 as described herein.

The gating of the optical isolator 320 causes conduction between terminals 4 and 3 of the optical isolator 320. When conduction is provided between terminals 4 and 3 of the optical isolator 320, the resistor (R64) of the gate bias circuit 330 has conduction therethrough via the resistor (R68) from the ignition coil 360 via the rectifier circuit 350. In some embodiments, the rectifier circuit 350 is provided to ensure that, regardless of the polarity of the signal that is provided from the ignition coil 360, the signal can be passed along to the gate bias circuit 330 via the rectifier circuit 350. Given the relative differences in magnitude of resistance of resistor (R64) (e.g., 100 in FIG. 5) and resistor (R68) (e.g., 270 K in FIG. 5), when conduction is permitted from terminal 4 to terminal 3 of the optical isolator 320, the voltage at the gate of the shutdown switching component 340 may be kept below the threshold voltage needed to gate or trigger the shutdown switching component 340. Thus, the shutdown switching component 340 may prevent shorting of the ignition coil 360 so that normal operation can occur.

However, if the signal indicative of operational presence of the processor 310 is lost, then the optical isolator 320 may no longer allow conduction between terminals 4 and 3 thereof. When terminals 4 and 3 of the optical isolator 320 do not conduct, they essentially appear as an open circuit and resistor (R64) is taken out of any conductive path between terminals SDH and SDL of the gate bias circuit 330. When this alternative path is removed, a large voltage may be built up at the gate of the shutdown switching component 340 (e.g., Q2) due to breakdown of the diode (D9) at the gate of the shutdown switching component 340. When the voltage build-up, powered from the ignition coil 360 via the rectifier circuit 350, reaches a level sufficient to gate or trigger the shutdown switching component 340, the shutdown switching component 340 turns on and creates a path to ground out the ignition coil 360. When the ignition coil 360 is grounded, the device may be shutdown.

As can be appreciated from FIGS. 4 and 5, the shutdown circuit 300 utilizes a normally-closed relay to ensure normal operation (e.g., of the engine 50) when the processor 310 is functioning normally. However, when the relay (which is an optically-isolated relay in one embodiment) is opened due to loss of the processor 310, the shutdown of the device may be reliably initiated since the processor 310 is not required to initiate the shutdown. Indeed, by configuring the shutdown circuit 300 to be controlled by the processor 310, but powered by the ignition coil 360, the shutdown circuit 300 can be made to return to a failsafe condition even if the processor 310 is incapable of directing the same. Accordingly, the processor 310 is enabled to interface with the shutdown switching component 340 for control purposes, but the shutdown switching component 340 does not rely upon the processor 310 for execution of its failsafe function. The isolation and structure is such that the shutdown switching component 340 is enabled to receive power for affecting a failsafe shutdown based on loss of the processor 310 using power provided by the ignition coil 360.

Figure 6:
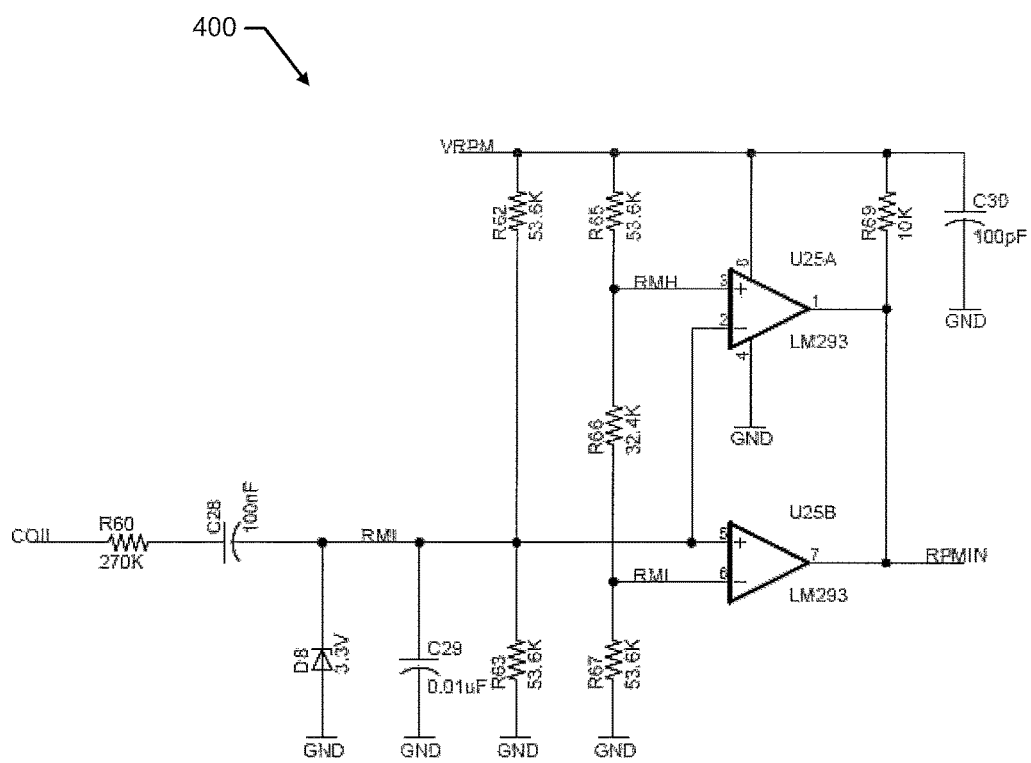
FIG. 6 illustrates a circuit diagram according to one possible implementation design of an RPM monitor circuit according to an example embodiment.

FIG. 6 illustrates an RPM monitoring circuit 400 of an example embodiment. As shown in FIG. 6, the RPM monitoring circuit 400 may interface with, and be powered from, the ignition coil 360 as well. Moreover, the RPM monitoring circuit 400 may employ op-amps in a configuration that ensures that, again, regardless of the polarity of the signal provided from the ignition coil 360, triggering may be provided to measure RPM. This may ensure that any type of engine can be monitored for RPM with the same RPM monitoring circuit.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits, or solutions to problems are described herein, it should be appreciated that such advantages, benefits, and/or solutions may be applicable to some example embodiments, but not necessarily all example embodiments. Thus, any advantages, benefits, or solutions described herein should not be thought of as being critical, required, or essential to all embodiments or to that which is claimed herein. Although specific terms are employed herein, they are used in a generic and descriptive sense only and not for purposes of limitation.

That which is claimed:

1. A lawn care device comprising:
an engine to selectively power the lawn care device;
a frame supporting the engine of the lawn care device;
an ignition system for selectively powering the engine based at least in part on operation of an ignition interface controlled by a processor; and
a shutdown circuit controlled by the processor, but powered by an ignition coil of the ignition system to generate a failsafe condition in response to failure or loss of the processor.

2. The lawn care device of claim 1, wherein the shutdown circuit comprises an optical isolator configured to interface with a gate bias circuit to trigger a shutdown switching component to short the ignition coil in response to the failure or loss of the processor.

3. The lawn care device of claim 2, wherein the optical isolator acts as a gate bypass relay to prevent the gate bias circuit from triggering the shutdown switching component in response to receipt of a signal indicative of operational presence of the processor.

4. The lawn care device of claim 3, wherein the optical isolator stops conducting to alter the gate bias circuit to trigger the shutdown switching component to short the ignition coil in response to loss of the signal indicative of operational presence of the processor.

5. The lawn care device of claim 2, wherein the shutdown circuit further comprises a rectifier circuit disposed between the ignition coil and the gate bias circuit to enable the gate bias circuit to operate to trigger the shutdown switching component regardless of a polarity of an input to the rectifier circuit from the ignition coil.

6. The lawn care device of claim 2, wherein the optical isolator comprises a transistor output optocoupler.

7. The lawn care device of claim 2, wherein the shutdown switching component comprises a bipolar junction transistor (BJT), or a field effect transistor (FET).

8. The lawn care device of claim 1, further comprising an RPM monitoring circuit powered by the ignition coil.

9. The lawn care device of claim 8, wherein the RPM monitoring circuit is configured to measure RPM regardless of polarity of a signal provided from the ignition coil.

10. The lawn care device of claim 1, wherein the shutdown circuit is operably coupled to one or more sensors,
wherein the shutdown circuit is configured to initiate a shutdown of the engine by shorting out the ignition coil under control of the processor based on conditions detected by the one or more sensors, and wherein the shutdown circuit is configured to initiate the shutdown of the engine by shorting out the ignition coil also in response to the failure or loss of the processor.

11. The lawn care device of claim 1, wherein the shutdown circuit is operably coupled to one or more sensors, wherein the shutdown circuit is configured to initiate a shutdown of the engine responsive to a gate signal provided by operation of the processor to cause shorting out the ignition coil based on conditions detected by the one or more sensors, and wherein the shutdown circuit is configured to initiate the shutdown of the engine by generating the gate signal upon loss of the processor to cause shorting out of the ignition coil.

12. The lawn care device of claim 1, wherein the shutdown circuit is configured to initiate a shutdown of the engine responsive to a gate signal provided due to the failure or loss of the processor to cause shorting out of the ignition coil.

13. The lawn care device of claim 1, wherein the shutdown circuit is configured to be powered by the ignition coil such that, responsive to the failure or loss of the processor while power to the processor is maintained, a shutdown of the engine is triggered responsive to a gate signal provided due to the failure or loss of the processor to cause shorting out of the ignition coil.

14. The lawn care device of claim 1, wherein the failsafe condition is generated in response to failure or loss of the processor while power is maintained to the processor.

* * * * *